(12) United States Patent
Sterling et al.

(10) Patent No.: US 12,011,867 B2
(45) Date of Patent: Jun. 18, 2024

(54) HYDRAULIC FITTING, AND APPLICATIONS THEREOF IN ROBOT SYSTEMS

(71) Applicant: Sanctuary Cognitive Systems Corporation, Vancouver (CA)

(72) Inventors: George E. G. Sterling, Vancouver (CA); Connor Richard Shannon, Vancouver (CA); Douglas Bruce Jelstad, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 52 days.

(21) Appl. No.: 17/867,071

(22) Filed: Jul. 18, 2022

(65) Prior Publication Data

US 2023/0020840 A1   Jan. 19, 2023

Related U.S. Application Data

(60) Provisional application No. 63/223,335, filed on Jul. 19, 2021.

(51) Int. Cl.
*F16L 33/00*   (2006.01)
*B25J 9/14*   (2006.01)
(Continued)

(52) U.S. Cl.
CPC ............. *B29C 57/04* (2013.01); *B25J 9/144* (2013.01); *F04B 39/12* (2013.01); *F16L 33/006* (2013.01);
(Continued)

(58) Field of Classification Search
CPC ......... F16L 33/006; F16L 33/28; F16L 33/00; F16L 23/02; F16L 23/0283; F16L 19/025; F16L 19/0212; F16L 41/086; F16L 47/14
See application file for complete search history.

(56) References Cited

U.S. PATENT DOCUMENTS 3,869,152 A * 3/1975 DeVincent ............ F16L 41/086
4,570,983 A * 2/1986 Olenfalk ............... F16L 41/086
(Continued)

FOREIGN PATENT DOCUMENTS

DE   202006003163 U1 * 6/2006
FR   2694064 A1 * 1/1994

OTHER PUBLICATIONS

FR-2694064-A1 - Machine Translation - English (Year: 1994).*
DE-202006003163-U1 - Machine Translation - English (Year: 2006).*

*Primary Examiner* — William S. Choi
(74) *Attorney, Agent, or Firm* — Thomas Mahon; Adenike Adebiyi (57) ABSTRACT

In an implementation, a hydraulic assembly comprising an end section of a hydraulic hose formed from a volume of material, the end section having a first outer diameter and an open end, is formed by molding a flange in the end section of the hydraulic hose, and threading an annular gasket onto the end section of the hydraulic hose between the flange and the open end of the hydraulic hose, and adjacent to the flange. The flange is formed in the volume of material, and has a second outer diameter greater than the first outer diameter. The molding of the flange may include applying heat to a mold, inserting the open end of the end section of the hydraulic hose into the mold, and thermally deforming a portion of the end section of the hydraulic hose to form the flange.

14 Claims, 8 Drawing Sheets

(51) Int. Cl.
  *B29C 57/04*    (2006.01)
  *F04B 39/12*    (2006.01)
  *F16L 33/28*    (2006.01)
  *F16L 41/08*    (2006.01)
  *B25J 19/00*    (2006.01)
  *B29K 101/12*   (2006.01)
  *B29L 23/00*    (2006.01)

(52) U.S. Cl.
  CPC ............. *F16L 33/28* (2013.01); *F16L 41/086* (2013.01); *B25J 19/0029* (2013.01); *B29K 2101/12* (2013.01); *B29L 2023/005* (2013.01)

(56) References Cited

U.S. PATENT DOCUMENTS

| | | | | |
|---|---|---|---|---|
| 4,770,447 | A * | 9/1988 | Umehara | F16L 41/086 |
| 5,906,226 | A * | 5/1999 | Goodman | |
| 2006/0022458 | A1* | 2/2006 | Droste | F16L 41/086 |
| 2013/0134707 | A1* | 5/2013 | Seryi | F16L 41/086 |
| 2018/0328327 | A1* | 11/2018 | Lang | |

\* cited by examiner

HYDRAULIC FITTING, AND APPLICATIONS THEREOF IN ROBOT SYSTEMS

TECHNICAL FIELD

The present systems, devices, and methods generally relate to hydraulic fittings, and particularly relate to hydraulic fittings for hydraulically-actuated robotic components.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Hydraulics is a technology involving mechanical properties and use of liquids, which is based on a theoretical foundation provided by fluid mechanics. In fluid power applications, hydraulics can be used for the generation, control, transmission, and distribution of power. In robotic applications, hydraulics can be used, alone or in combination with electric motors and other power sources, to distribute power to a robot's components, e.g., actuators.

BRIEF SUMMARY

A method of forming a hydraulic assembly, the hydraulic assembly comprising an end section of a hydraulic hose formed from a volume of material, the end section having a first outer diameter and an open end, may be summarized as comprising molding a flange in the end section of the hydraulic hose, the flange formed in the volume of material, the flange having a second outer diameter greater than the first outer diameter, and threading an annular gasket onto the end section of the hydraulic hose between the flange and the open end of the hydraulic hose, the annular gasket adjacent to the flange.

In some implementations, the molding a flange in the end section of the hydraulic hose includes applying heat to a mold, inserting the open end of the end section of the hydraulic hose into the mold, and thermally deforming a portion of the end section of the hydraulic hose to form the flange. The molding a flange in the end section of the hydraulic hose may further include inserting a pin into the open end of the end section of the hydraulic hose to maintain an inner diameter of the end section of the hydraulic hose. The molding a flange in the end section of the hydraulic hose may further include capping the mold to form an at least approximately flat top surface of the flange. The molding a flange in the end section of the hydraulic hose may further include cooling the mold and ejecting the end section of the hydraulic hose from the mold.

In some implementations, the hydraulic assembly further comprises a first port and a second port, and an axial bore extending between the first and the second port, and the method further comprises inserting the end section of the hydraulic hose into the axial bore of the body through the first port. The inserting the hydraulic hose into the axial bore of the body through the first port may include inserting a length of the hydraulic hose into the axial bore of the body, the length of the hydraulic hose being less than a distance along the axial bore between the first port and the second port. The inserting the hydraulic hose into the axial bore of the body through the first port may include urging the flange towards an interface of the body whereby a hydraulic seal is formed between an outer surface of the hydraulic hose and the interface of the body. The method may further comprise securing the hydraulic hose to the body. The securing the hydraulic hose to the body may include forming a seal between the body and the hydraulic hose by compression. The securing the hydraulic hose to the body may include threading a cover plate onto the end section of the hydraulic hose concentric with, and adjacent to, the flange, the cover plate positioned further from the open end than the flange, and securing the hydraulic hose to the body by securing the cover plate to the body. The securing the cover plate to the body may include securing the cover plate to the body by at least one screw.

In some implementations, the molding a flange in the end section of the hydraulic hose, the flange formed in the volume of material includes molding the flange in a thermoplastic material.

In some implementations, the threading an annular gasket onto the end section of the hydraulic hose includes threading an O-ring onto the end section of the hydraulic hose.

In some implementations, the forming a hydraulic assembly, an end section of the hydraulic hose formed from a volume of material includes forming the hydraulic assembly, the end section of the hydraulic hose formed from a single continuous volume of material.

A hydraulic assembly may be summarized as comprising a hydraulic hose having an end section that terminates at an open end, the end section formed from a volume of material, the end section comprising, a first length of hose having a first outer diameter, a flange adjoining the first length of hose, the flange formed in the volume of material, the flange having a second outer diameter, and a second length of hose adjoining the flange and terminating at the open end, the second length of hose having a third outer diameter, and an annular gasket threaded onto the second length of hose adjacent to the flange, and between the flange and the open end of the hydraulic hose, wherein the second outer diameter is greater than the first outer diameter and the third outer diameter.

In some implementations, the volume of material comprises a thermoplastic material. The thermoplastic material may be nylon.

In some implementations, the second outer diameter is at least 10% greater than the first outer diameter and the third outer diameter.

In some implementations, the first outer diameter is 0.055" or less. The second outer diameter may be 0.0625" or more.

In some implementations, the annular gasket is an O-ring.

In some implementations, at least a portion of the end section comprises a molded section of hose that includes the flange.

In some implementations, the first length of hose, the flange, and the second length of hose have at least approximately a same inner diameter.

In some implementations, the hydraulic assembly further comprises a body having a first port and a second port, and an axial bore extending therebetween, a length of the hydraulic hose inserted into the axial bore through the first port, the length of the hydraulic hose being less than a distance along the axial bore between the first port and the second port. The annular gasket may form an interference-fit with an inner surface of the axial bore. The body of the assembly may include an interface towards which, during the inserting of the hydraulic hose into the axial bore through the first port, the flange is urged to form a hydraulic seal between an outer surface of the hydraulic hose and the body. A first diameter of the axial bore at the first port may be larger than a second diameter of the axial bore at the second port. The hydraulic assembly may further comprise a cover plate securing the hydraulic hose to the body. The body may be a body of a hydraulic manifold.

A robot may be summarized as comprising a robot body, a hydraulic control system physically coupled to the robot body, a hydraulically-actuated component physically coupled to the robot body, the hydraulically-actuated component operable to cause a motion of at least a portion of the robot, and a hydraulic assembly comprising a hydraulic hose having an end section that terminates at an open end, the end section formed from a volume of material, a flange molded in the volume of material of the end section of the hydraulic hose, and an annular gasket threaded onto the end section of the hydraulic hose, the end section of the hydraulic hose having an open end, the annular gasket being adjacent to the flange, the annular gasket positioned closer to the open end than the flange, wherein the hydraulically-actuated component is hydraulically coupled to the hydraulic control system by the hydraulic assembly.

In some implementations, the hydraulic assembly further comprises a body having a first port and a second port, and an axial bore extending therebetween, a length of the end section of the hydraulic hose inserted into the axial bore through the first port, the length of the end section of the hydraulic hose being less than a distance along the axial bore between the first port and the second port, wherein the body of the assembly includes an interface towards which, during the inserting of the end section of the hydraulic hose into the axial bore through the first port, the flange is urged to form a hydraulic seal between an outer surface of the end section of the hydraulic hose and the body.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The technology described in the present application includes systems, devices, and methods for hydraulically-powered robots. In particular, the present application describes hydraulic fittings and methods for forming a hydraulic fitting on an end of a hydraulic hose. In the present application, elements of the hydraulic fitting in combination with the hydraulic hose are referred to as a hydraulic assembly.

In some applications of robotic systems in general, and humanoid robots in particular, it can be desirable for end effectors to have sufficient power and precision while fitting within a certain form factor. It can also be desirable for couplings (e.g., cables, hoses, wires, etc.) between the end effector and other components of the robotic system to be at least partially internal to the robot. External couplings can be unsightly, and can increase the external dimensions of the robot making it more difficult for the robot to operate in restricted spaces. External couplings can also be a hazard, and may cause damage to the robot, or the robot's environment, if the couplings snag on an object in the robot's environment, for example.

Technology described in the present application includes hydraulic fittings for hydraulic applications including but not limited to hydraulic systems providing power in a robotic system. For example, hydraulic fittings can be used in a hydraulic system providing power to an end effector of a robotic system (e.g., to a hand of a humanoid robot), wherein some or all of the hydraulic system is adapted and/or miniaturized to fit at least partially inside the robot (e.g., inside a robotic arm).

In some implementations, at least a portion of the hydraulic system (e.g., at least one hydraulic hose) is routed through a pivot joint (e.g., a shoulder, an elbow, a forearm, a wrist and/or a knuckle of the robotic arm). A pivot joint can be an example of a restricted space. A restricted space may be restricted in volume, for example. A restricted space may include moving components that can interfere with hydraulic hoses in the space and/or traversing the space, as well as other hydraulic fittings and components in the space. A restricted space may have a volume and/or a shape that can change during operation, e.g. the robot is in motion or is executing a task. In restricted spaces in general, and pivot joints as an example, it can be advantageous for hydraulic fittings to be more compact. It may also be advantageous for a hydraulic hose to have a smaller diameter in restricted spaces, and this can result in one or more additional hydraulic fittings upstream and/or downstream.

An object or shape is defined as humanoid when it has an appearance, or a character, resembling that of a human. For example, a humanoid robot is a robot having an appearance or a character resembling that of a human. A humanoid robot may be "humanoid" in its entirety or may have humanoid components (e.g., a torso, a head, arms, and hands) coupled to non-humanoid components (e.g., a wheeled base). While the following description focuses mainly on a hydraulically-powered humanoid robot, a person of skill in the art will appreciate that a hydraulic system in accordance with the present technology may be used to control a hand, a foot, a tail, a head, or any applicable end effector or actuator in a humanoid or non-humanoid robot.

Using hydraulics to drive a robotic arm and/or an end effector can be advantageous for reasons that include the following:

Hydraulics can provide high speed and strength within a humanoid envelope of shape and size.

To accommodate humanoid envelope constraints, components (e.g., a motor) can be located outside the envelope, or at least outside regions where volume is constrained, and hydraulically coupled to components inside the envelope. Components of a hydraulic system are said to be hydraulically coupled if the components are coupled by a hydraulic fluid.

Hydraulics can provide a high power density especially if the motor is outside the constrained volume.

Hydraulics can at least reduce hysteresis in motion. Hysteresis can manifest as a twitchiness in the movement of the robot. Since hydraulic fluid can be substantially incompressible, there can be little or no potential energy to be released at the moment the static coefficients of friction are exceeded.

Hydraulics can provide centralized power and thereby apply full power onto a single degree of freedom (DOF).

Hydraulics can provide high-fidelity control of the robot, i.e., high precision in the movement of the robot.

Hydraulic systems include hydraulic hoses to provide hydraulic coupling, and hydraulic fittings to secure hydraulic hoses to other hydraulic components, e.g., pumps, valves, and actuation pistons. Conventional fittings can include "push-to-connect", barbed, and compression fittings. Compression fittings may include a leak-tight fitting swage which forms a tubing that can hold the fitting in place. Compression may include the urging of one surface towards another surface. Conventional fittings can include O-ring face seal fittings.

Some conventional fittings are not readily serviceable, and must be replaced if they fail. For example, fittings may deploy O-ring seals where an O-ring is inaccessible, or at least hard to access. Furthermore, conventional fittings may not be designed with compactness in mind, and, as described above, it can be advantageous to have more compact fittings.

Also, as described above, it can be advantageous to employ a hydraulic hose with a smaller diameter than is typically used. This can be particularly advantageous for hydraulic hoses that are housed in a restricted space (e.g., a pivot joint) and/or traverse a restricted space. In some implementations of the present systems, devices, and methods, a hydraulic hose with an outer diameter of 0.055" is used. Conventional fittings may not be suitable, and may not even be available, for such small-diameter hydraulic hoses.

The technology described in the present application includes a flange formed on the outside of a hydraulic hose in the material of the hydraulic hose. The flange can be suitable for holding an annular gasket (e.g., an O-ring) in place in a hydraulic assembly that forms a hydraulic connection between the hydraulic hose and a hydraulic component of a hydraulic system.

The technology described in the present application may be particularly useful for thermoplastic hydraulic hoses, e.g., a hose comprising nylon or another suitable synthetic resin. A thermoplastic material can become plastic on heating, and harden on cooling.

Figure 1A:
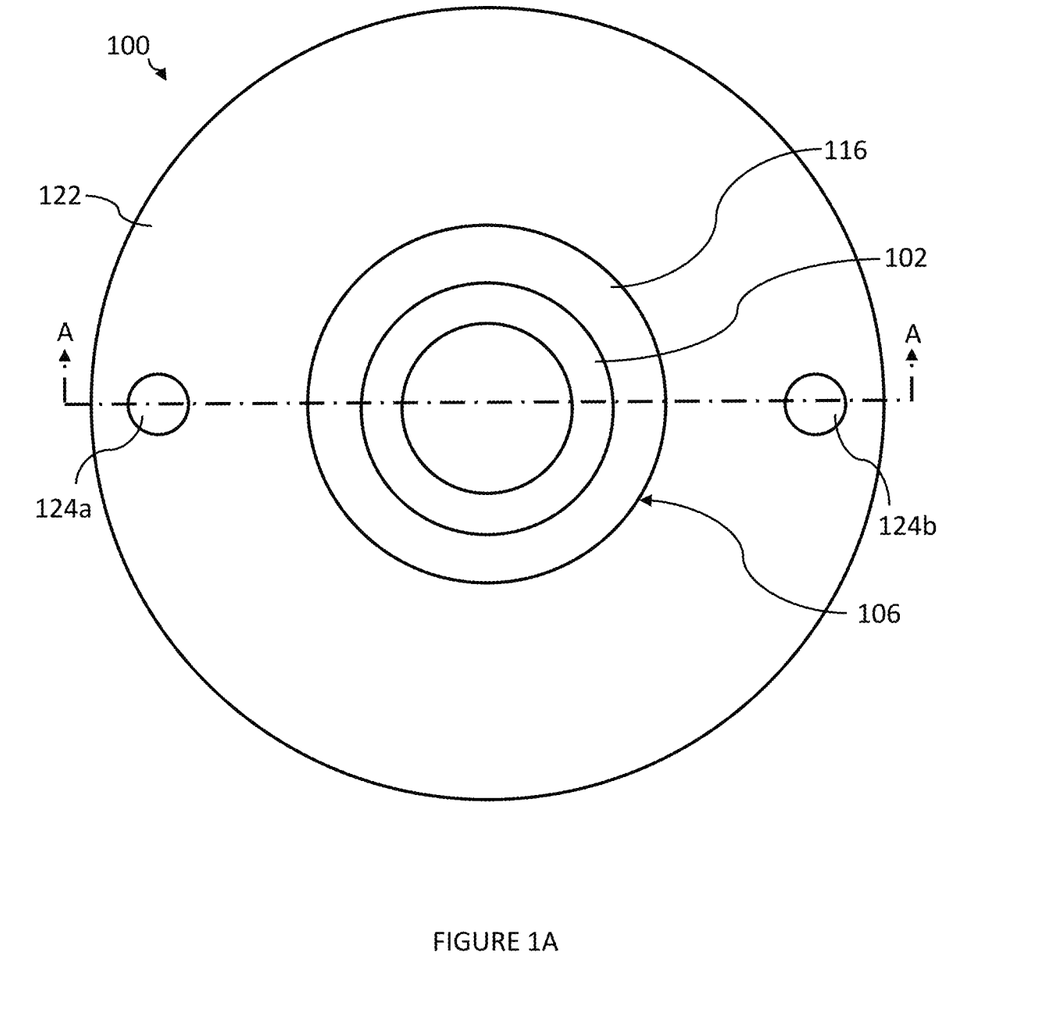
FIGS. 1A and 1B are schematic drawings of an example implementation of a hydraulic assembly that forms a hydraulic connection between a hydraulic component and a hydraulic hose, in accordance with the present systems, devices, and methods.
Figure 1B:
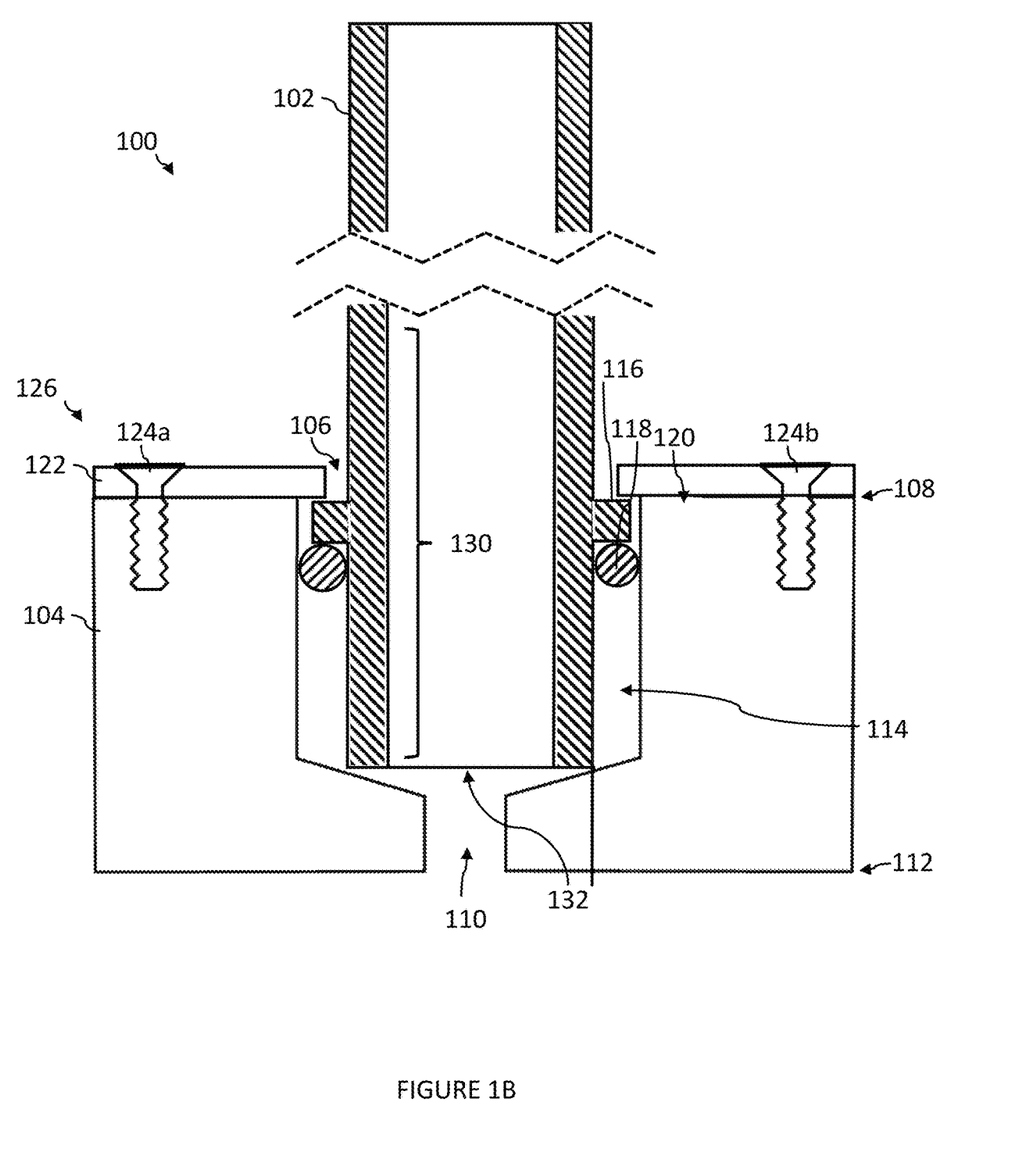

FIGS. 1A and 1B are schematic diagrams of an example implementation of a hydraulic assembly 100 that forms a hydraulic connection between a hydraulic component 126 and a hydraulic hose 102, in accordance with the present systems, devices, and methods. FIG. 1A is a plan view of assembly 100. FIG. 1B is a side view of hydraulic assembly 100 in cross-section along line A-A of FIG. 1A. Hydraulic assembly 100 is described below with reference to both FIGS. 1A and 1B. Some elements of hydraulic assembly 100 are not visible in the plan view of FIG. 1A.

In some implementations, hydraulic component 126 is a hydraulic unit, for example, a hydraulic pump, an actuation piston, a valve, and the like. In other implementations, hydraulic component 126 is a hydraulic routing element, for example, a manifold, a coupling to a hydraulic hose of a different diameter, and the like.

Hydraulic component 126 of assembly 100 comprises a body 104 (shown in FIG. 1B, not visible in FIG. 1A) with an upper port 106 on an upper surface 108 of body 104, and a lower port 110 on a lower surface 112 of body 104. Upper port 106 and lower port 110 are joined by an axial bore 114.

In some implementations, hydraulic hose 102 has an approximately uniform outer diameter along its length. In some implementations, hydraulic hose 102 has a tapered inner and/or outer diameter, such as the tapered hoses described in U.S. Provisional Patent Application Ser. No. 63/197,653, filed Jun. 7, 2021 and entitled "Tapered Hydraulic Hose, Methods Of Making, And Applications Thereof In Robot Systems", which is incorporated herein by reference in its entirety.

In assembly 100, an end section 130 of hydraulic hose 102 has been deformed to fashion a pronounced flange 116 in end section 130 around the outside of hydraulic hose 102. Example methods for deforming end section 130 of hydraulic hose 102 to fashion flange 116 are described below. End section 130 of hydraulic hose 102 may be molded to fashion flange 116. In some implementations, molding flange 116 in hydraulic hose 102 includes applying heat to a mold and/or applying heat to hydraulic hose 102.

In some implementations, flange 116 of hydraulic hose 102 is within a range of 2 mm-20 mm from an open end 132 of hydraulic hose 102. In some implementations, an outer diameter of flange 116 is at least 10% larger than an outer diameter of hydraulic hose 102. In some implementations, an outer diameter of flange 116 is at least approximately 0.0625" and an outer diameter of hydraulic hose 102 is at least approximately 0.055".

Assembly 100 also comprises an annular gasket 118. Annular gasket 118 can be threaded onto hydraulic hose 102 by passing hydraulic hose 102 through annular gasket 118 until annular gasket 118 is in position on hydraulic hose 102, i.e., annular gasket 118 is adjacent to flange 116. Annular gasket 118 may be an O-ring.

In the present application, annular gasket 118, hydraulic hose 102, and (optionally) elements of hydraulic component 126 to which hydraulic hose 102 is connected, may also be referred to as a hydraulic fitting.

In some implementations of the present systems, devices, and methods, an outer diameter of annular gasket 118 is greater than an outer diameter of flange 116. In these implementations, annular gasket 118 extends radially beyond an outer edge of flange 116 to contact an inner wall of axial bore 114.

In other implementations, the outer diameter of annular gasket 118 is less than or equal to the outer diameter of flange 116. In use, when the hydraulic fitting of these implementations is pressurized, the outer diameter of annular gasket 118 can increase to form a seal with the inner wall of axial bore 114.

In some implementations, the outer diameter of annular gasket 118 is selected to form an interference fit with the inner wall of axial bore 114. In these implementations, the outer diameter of annular gasket 118 is typically approximately the same as an inner diameter of axial bore 114 plus sufficient additional diameter to form the interference fit and form a seal with the inner wall of axial bore 114, i.e., the outer diameter of annular gasket 118 slightly exceeds the inner diameter of axial bore 114.

End section 130 can be secured by a cover plate 122. Cover plate 122 can be fastened to body 104 by screws, e.g., screws 124a and 124b. End section 130 may be secured by another suitable securing mechanism, and cover plate 122 may be fastened to body 104 by another suitable fastener.

End section 130 may be formed from a single continuous volume of material. Other sections of hydraulic hose 102 may be formed from other materials and/or from other segments of the same material as end section 130.

Figure 2A:
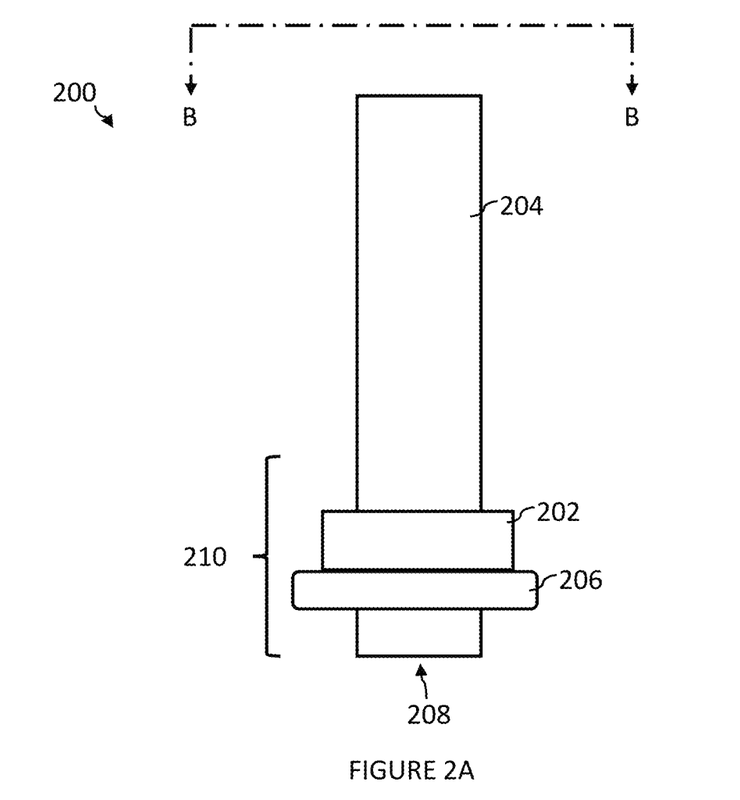
FIG. 2A is a schematic drawing of a side elevation of an example implementation of a hydraulic fitting, in accordance with the present systems, devices, and methods.

FIG. 2A is a schematic drawing of a side elevation of an example implementation of a hydraulic fitting, in accordance with the present systems, devices, and methods. Hydraulic fitting 200 includes a pronounced flange 202 fashioned in a hydraulic hose 204 by deforming hydraulic hose 204. Hydraulic fitting 200 also includes an annular gasket 206 (e.g., an O-ring) threaded onto open end 208 of an end section 210 of hydraulic hose 204.

Figure 2B:
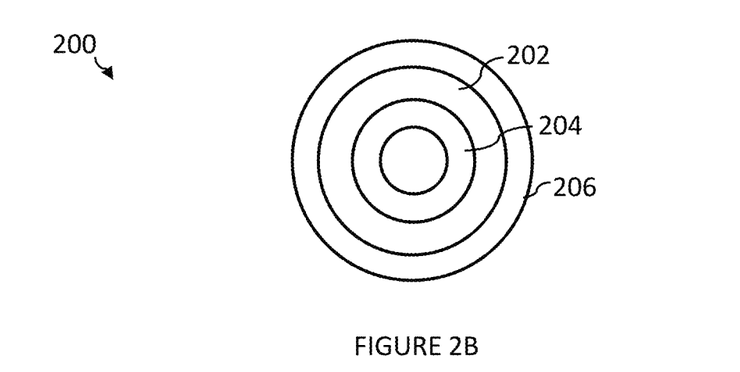
FIG. 2B is a schematic drawing of a plan view of the hydraulic fitting of FIG. 2A in direction of arrows B-B, in accordance with the present systems, devices, and methods.

FIG. 2B is a schematic drawing of a plan view of hydraulic fitting 200 of FIG. 2A in direction of arrows B-B, in accordance with the present systems, devices, and methods.

Figure 3:
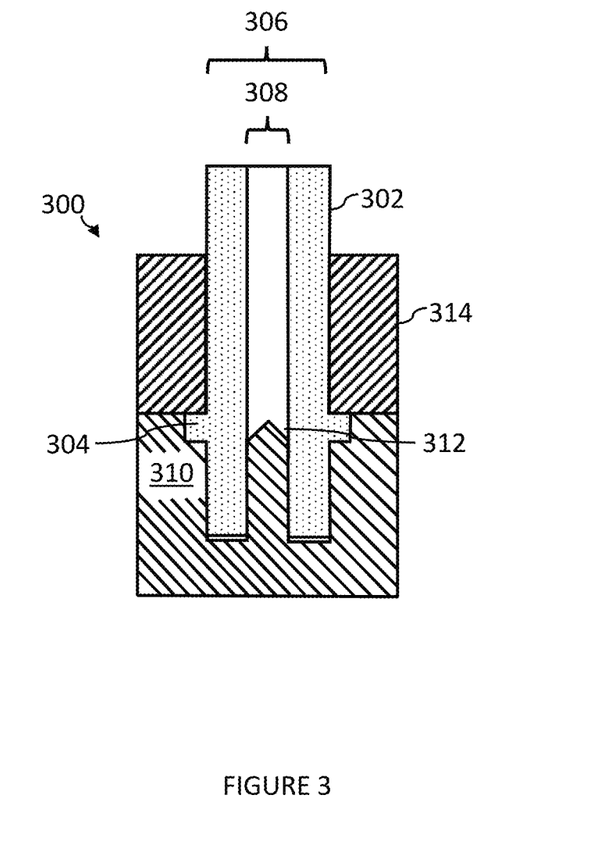
FIG. 3 is a cross-sectional view of an apparatus for fashioning a flange in a hydraulic hose (e.g., the flange in the hydraulic hose of FIGS. 2A and 2B), in accordance with the present systems, devices, and methods.

FIG. 3 is a cross-sectional view of an apparatus 300 for fashioning a flange in a hydraulic hose (e.g., flange 202 in hydraulic hose 204 of FIGS. 2A and 2B), in accordance with the present systems, devices, and methods. In addition to apparatus 300, FIG. 3 also illustrates a hydraulic hose 302 positioned in apparatus 300 for the purposes of fashioning flange 304 in hydraulic hose 302. Hydraulic hose 302 has an outer diameter 306 and an inner diameter 308.

Apparatus 300 includes a body 310 which, in cross-section, resembles a "W" shape. Body 310 includes a central pin 312 which fits inside hydraulic hose 302 to provide support and maintain inner diameter 308 during the fashioning of flange 304 in hydraulic hose 302. In some implementations, body 310 includes metal. In some implementations, body 310 includes another suitable thermally-conductive material.

Apparatus 300 further includes an annular insulator guide 314. Insulator guide 314 can include thermally-insulative material.

During the fashioning of flange 304 in hydraulic hose 302, heat can be applied to body 310, and central pin 312 can be pushed into inner diameter 308 of hydraulic hose 302. Body 310 can act as a mold which, when heated, can cause local melting of hydraulic hose 302, and a local deforming of hydraulic hose 302 to fashion flange 304 in outer diameter 306 of hydraulic hose 302. Body 310 can subsequently be removed from hydraulic hose 302. In some implementations, body 310 is allowed to cool before removing body 310 from hydraulic hose 302. In some implementations, an ultrasonic welding process may be used to form flange 304, either by melting hose 302 to shape flange 304 as described above, or by joining hose 302 to a separate discrete flange portion.

Figure 4:
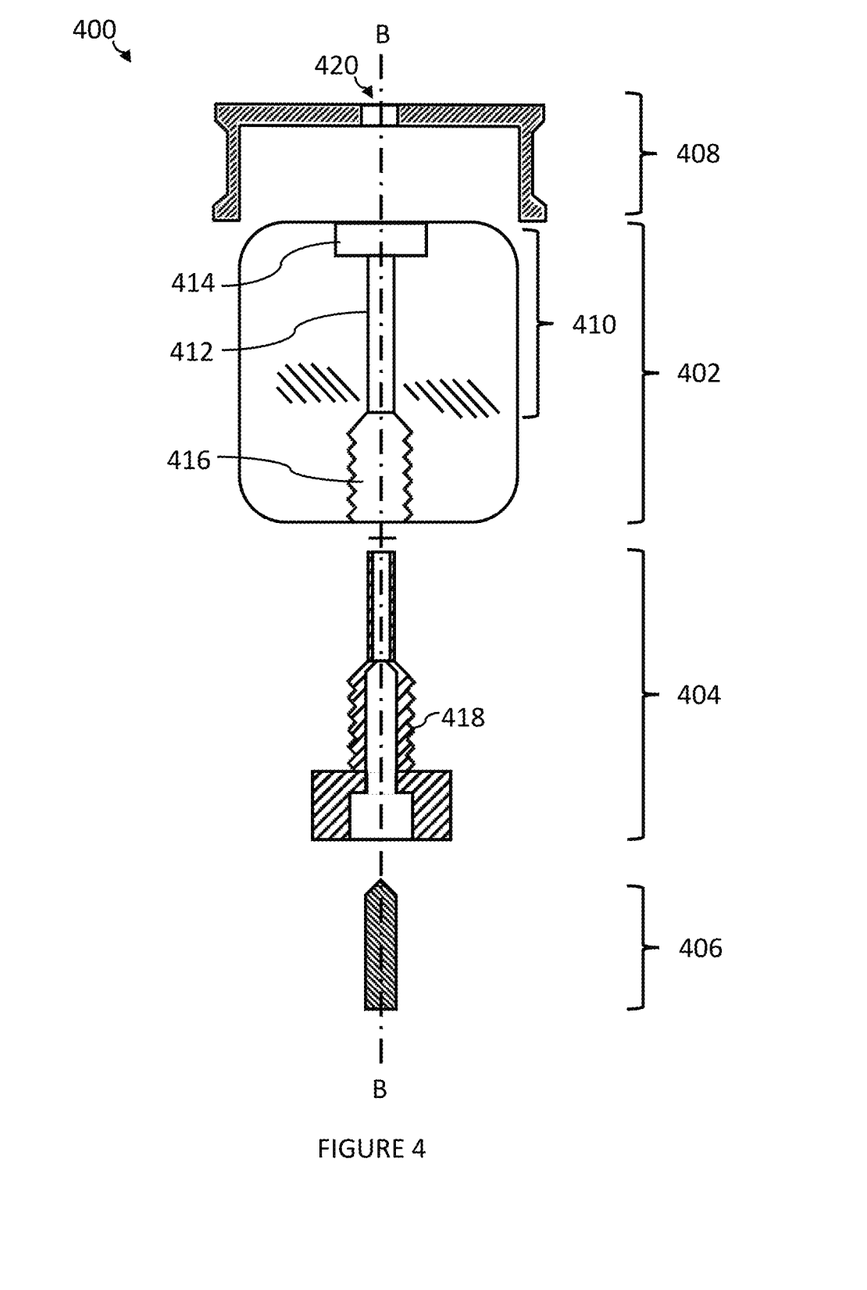
FIG. 4 is a cross-sectional and exploded view of another apparatus for fashioning a flange in a hydraulic hose (e.g., the flange in the hydraulic hose of FIGS. 2A and 2B), in accordance with the present systems, devices, and methods.

FIG. 4 is a cross-sectional and exploded view of another apparatus 400 for fashioning a flange in a hydraulic hose (e.g., flange 202 in hydraulic hose 204 of FIGS. 2A and 2B), in accordance with the present systems, devices, and methods. Apparatus 400 includes four parts—a body 402, a core 404, a pin 406, and a cap 408.

Body 402 includes a mold section 410. Mold section 410 includes a first bore 412 sized to accommodate a hydraulic hose (not shown in FIG. 4), and a second bore 414 sized to accommodate a pronounced flange in an outer diameter of the hydraulic hose. The flange can be fashioned by a deformation of the hydraulic hose in mold section 410. During the fashioning of the flange, body 402 can be heated to cause a thermoplastic hydraulic hose to deform to the shape of mold section 410.

Body 402 also includes a threaded bore 416 to accommodate a screw 418 of core 404. In operation, during fashioning of the flange, core 404 can be used to adjust a length of the hydraulic hose that extends from an open end of the hydraulic hose to the flange. Screwing core 404 further into body 402 can reduce the length of hydraulic hose that extends from the open end to the flange.

Core 404 can also be used to assist with ejection of the molded hydraulic hose. Screwing core 404 further into body 402 can push the hydraulic hose out of mold section 410, and assist in causing the hydraulic hose to be ejected from apparatus 400.

A diameter of pin 406 can be selected to at least approximately match an inner diameter of the hydraulic hose. During operation, pin 406 can pass through apparatus 400 and extend into the inner diameter of the hydraulic hose to provide support and to maintain the inner diameter while the hydraulic hose is heated.

Molding the flange, in which the material of the hydraulic hose is deformed, may also affect the shape of other elements of the hydraulic hose. For example, molding the flange may reduce a wall thickness of the hydraulic hose above and/or below the flange. Molding the flange may cause a shortening of the hydraulic hose.

Cap 408 includes a bore 420 through which the hydraulic hose is passed into mold section 410 of body 402. During fashioning of the flange in the hydraulic hose, cap 408 can be used to form a top of the flange. Cap 408 can be used to form a flat top to the flange. During heating of mold section 410, melted material from the hydraulic hose can overflow a top of mold section 410 (e.g., melted material can bubble up and out of bore 414). Cap 408 can be used to constrain the melted material that would otherwise overflow the top of mold section 410.

The hydraulic hose enters apparatus 400 at the top of FIG. 4, i.e., through bore 420 of cap 408. The hydraulic hose does not extend beyond mold section 410 of body 402.

As described in more detail with reference to FIG. 5, apparatus 400 may be actively cooled (e.g., in water), or left to cool, after the flange has been fashioned, and then apparatus 400 may be disassembled.

Figure 5:
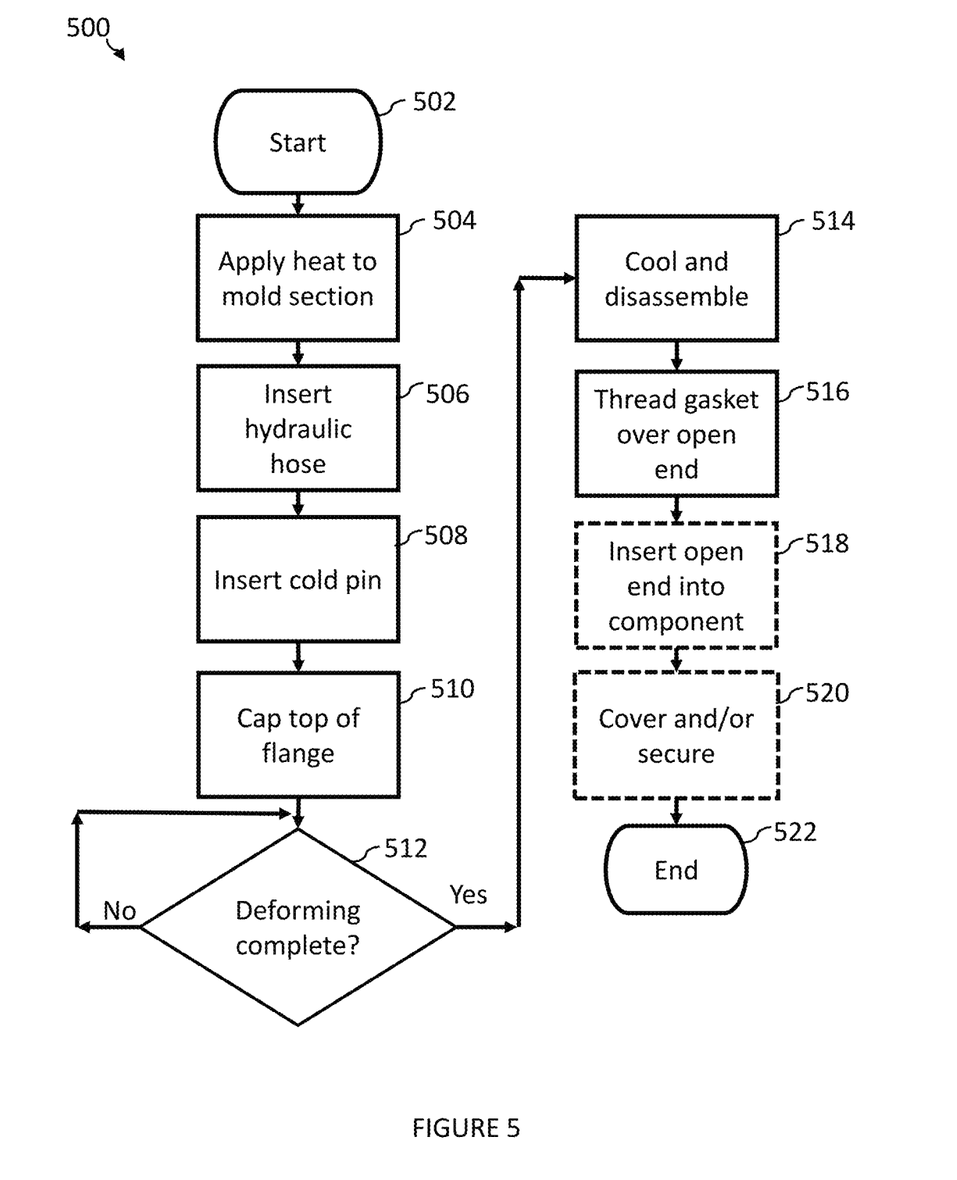
FIG. 5 is a flow chart of an example implementation of a method for forming a hydraulic connection between a hydraulic component and a hydraulic hose, in accordance with the present systems, devices, and methods.

FIG. 5 is a flow chart of an example implementation of a method 500 for forming a hydraulic assembly, in accordance with the present systems, devices, and methods. Method 500 of FIG. 5 includes eleven (11) acts 502, 504, 506, 508, 510, 512, 514, 516, 518, 520, and 522. Acts 518 and 520 are optional, as indicated in FIG. 5 by the dashed lines. Those of skill in the art will appreciate that in alternative implementations certain acts of FIG. 5 may be omitted and/or additional acts may be added. Those of skill in the art will also appreciate that the illustrated order of the acts is shown for exemplary purposes only and may change in alternative implementations.

At 502, in response to a starting condition (e.g., receipt of a hydraulic component and a hydraulic hose for connection), method 500 starts. At 504, heat is applied to a mold section (e.g., mold section 410 of FIG. 4) of an apparatus for fashioning a flange in a hydraulic hose. In some implementations, the mold section comprises metal. At 506, the hydraulic hose is inserted into the mold section of the apparatus. In some implementations, the hydraulic hose comprises a thermoplastic material, e.g., nylon.

At 508, a cold (unheated) pin is inserted into an open end of the hydraulic hose. At 510, a cap is placed on top of the mold section, on top of the bore where the flange will be molded. In some implementations, a force is applied to press the hydraulic hose into the bore. In some implementations, the hydraulic hose and the mold section are held fixed in place relative to each other.

At 512, the method waits until deformation of the hydraulic hose to mold the flange is determined to be complete, at which time the method proceeds to 514, and the apparatus is cooled (or allowed to cool) and then disassembled. The apparatus may be cooled with water, for example.

At 516, an annular gasket is threaded over an open end of the hydraulic hose to sit adjacent to the flange in the hydraulic hose.

After 516, a hydraulic assembly comprising the hydraulic hose with the molded flange and the annular gasket has been formed, and method 500 can proceed to 522 where method 500 ends.

Optionally (as indicated by the dashed lines in FIG. 5), at 518, the open end of the hydraulic hose, with the gasket and the flange, is inserted into a hydraulic component, e.g., a manifold. At 520, the flange is covered and/or secured, for example by a cover plate held in place by one or more screws. After 520, a hydraulic assembly comprising the hydraulic hose with the molded flange and the annular gasket, and augmented by the hydraulic component has been formed, and method 500 proceeds to 522 where method 500 ends.

Figure 6:
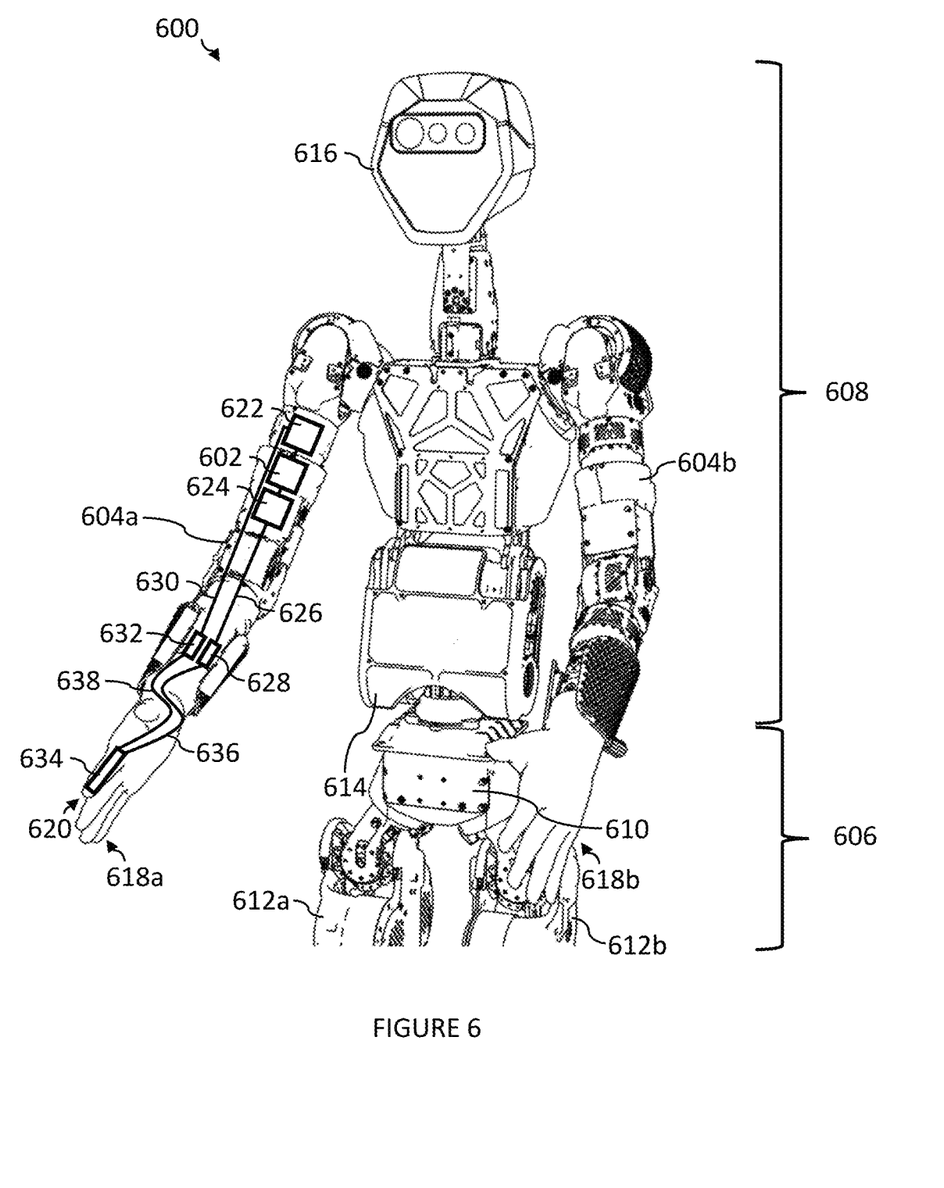
FIG. 6 is a schematic drawing of an example implementation of a hydraulically-powered robot with a hydraulic pump integrated with an arm of the robot, in accordance with the present systems, devices, and methods.

FIG. 6 is a schematic drawing of an example implementation of a hydraulically-powered robot 600 with a hydraulic pump 602 integrated with an arm 604a of robot 600, in accordance with the present systems, devices, and methods. Hoses are also referred to in the present application as hydraulic hoses.

Robot 600 comprises a base 606 and a humanoid upper body 608. Base 606 comprises a pelvic region 610 and two legs 612a and 612b (collectively referred to as legs 612). Only the upper portion of legs 612 is shown in FIG. 6. In other example implementations, base 606 may comprise a stand and (optionally) one or more wheels.

Upper body 608 comprises a torso 614, a head 616, right-side arm 604a and a left-side arm 604b (collectively referred to as arms 604), and a right hand 618a and a left hand 618b (collectively referred to as hands 618). Arms 604 of robot 600 are also referred to in the present application as robotic arms. Arms 604 of robot 600 are humanoid arms. In other implementations, arms 604 have a form factor that is different from a form factor of a humanoid arm.

Hands 618 are also referred to in the present application as end effectors. In other implementations, hands 618 have a form factor that is different from a form factor of a humanoid hand. Each of hands 618 comprises one or more digits, for example, digit 620 of hand 618a. Digits may include fingers, thumbs, or similar structures of the hand or end effector.

In some implementations, base 604 and/or torso 614 of upper body 608 house a hydraulic control system, for example. In some implementations, components of the hydraulic control system may alternatively be located outside the robot, e.g., on a wheeled unit that rolls with the robot as it moves around, or in a fixed station to which the robot is tethered.

The hydraulic control system of robot 600 comprises a hydraulic pump 602, a reservoir 622, and an accumulator 624, housed in arm 604a. Hose 626 provides a hydraulic coupling between accumulator 624 and a pressure valve 628 of the hydraulic control system. Hose 630 provides a hydraulic coupling between an exhaust valve 632 of the hydraulic control system and reservoir 622.

Pressure valve 628 is hydraulically coupled to an actuation piston 634 by a hose 636. Actuation piston 634 is hydraulically coupled to exhaust valve 632 by a hose 638. Hoses 626 and 636, and pressure valve 628, provide a forward path to actuation piston 634. Hoses 630 and 638, and exhaust valve 632 provide a return path to actuation piston 634. Pressure valve 628 and exhaust valve 632 can control actuation piston 634, and can cause actuation piston 634 to move, which can cause a corresponding motion of at least a portion of hand 618a, for example, digit 620.

In some implementations, pressure valve 628 and exhaust valve 632 are electrohydraulic servo valves controlled by a controller (not shown in FIG. 6). The electrohydraulic servo valves are also referred to in the present application as servo valves and servo-controlled valves. The controller may be implemented by any suitable combination of hardware, software, and/or firmware. The controller may include, for example one or more application-specific integrated circuit(s), standard integrated circuit(s), and/or computer program(s) executed by any number of computers, microcontrollers, and/or processors (including, e.g., microprocessors, central processing units). In other implementations, other suitable types of valves may be used.

In other implementations, the hydraulic drive mechanism includes a motor and a drive piston. The drive piston can be propelled forward linearly by a leadscrew that can be coupled to the motor through a flexible shaft coupler. The drive piston can be hydraulically coupled to a hose containing a hydraulic fluid. The hose can extend from the drive piston to an actuation piston located elsewhere on robot 600, for example, in hand 618a. When the drive piston is driven by the motor, the actuation piston can be forced to move, which can cause a corresponding motion of at least a portion of robot 600.

In some implementations, the hydraulic fluid in the hydraulic hoses of FIG. 6 (including hoses 626, 630, 636, and 638) is an oil, for example, peanut oil or mineral oil.

Each of hands 618 may have more than one degree of freedom (DOF). In some implementations, each hand has up to eighteen (18) DOFs. Each DOF can be driven by a respective actuation piston (for example, actuation piston 634). For clarity of illustration, only one actuation piston is shown in FIG. 6. Each actuation piston may be located in hands 618.

Single-action pistons can use a spring to provide a return action for the piston. A DOF may be double-acting to enable a push-pull motion, which means there is a respective hose coupled to each side of the actuation piston. In one implementation, there are two double-acting DOFs, and consequently twenty (20) hoses running to each of hands 618 to control eighteen (18) DOFs of each hand. In some implementations, at least some of the hoses shown in FIG. 6 (e.g., hoses 626, 630, 636, and 638) belong to a bundle of hoses that can accommodate twenty (20) one-eighth inch (⅛ in.) hoses.

In some implementations, a robot with an integrated hydraulic system, such as robot 600 of FIG. 6, may employ any or all of the teachings of U.S. Provisional Patent Application Ser. No. 63/191,732, filed May 21, 2021 and entitled "Systems, Devices, and Methods for A Hydraulic Robot Arm", which is incorporated herein by reference in its entirety.

A hydraulic hose can have one or more tapered sections along a length of the hose. A hydraulic hose with tapered sections can be installed in a robot such that the tapered sections coincide with particular locations along a fluid path, such as restricted spaces and/or parts of the robot requiring greater flexibility.

Though the example implementation of FIG. 6 of a hydraulically-powered robot with only a single hydraulic system, a person of skill in the art will appreciate that a hydraulically-powered robot may include multiple hydraulic systems. In some implementations, at least some of the multiple hydraulic systems are hydraulically-isolated from one another. In some implementations, at least some of the multiple hydraulic systems share a common hydraulic pump.

It can be beneficial for a hydraulically-powered robot to have multiple hydraulically-isolated hydraulic systems. For example, a hydraulically-powered robot may have multiple components or devices that include hydraulic actuators. A single hydraulic system operable to control the hydraulic actuators of multiple components or devices may be too large, complex, or costly for practical implementations. It may be difficult, for example, to route hydraulic hoses from a single shared pump to multiple components or devices located in different regions of the robot (especially internally, as in robot 600). A hydraulic system dedicated to a single component or device, or dedicated to a subset of the multiple components or devices, may be more localized, and more readily adapted to fit within a desired form factor.

Hydraulic assembly 100 of FIGS. 1A and 1B can be used in the hydraulic control system of robot 600 to provide hydraulic coupling of hydraulic hoses (e.g., hoses 626, 630, 636, and 638) to hydraulic components (e.g., hydraulic pump 602, reservoir 622, accumulator 624, pressure valve 628, exhaust valve 632, and actuation piston 634). For example, a hydraulic component may include a body having an upper port and a lower port (e.g., body 104, and upper and lower ports 106 and 110 of FIG. 1) for receiving a hydraulic hose. The hydraulic hose may be inserted into the upper port and secured to the body as described with reference to FIGS. 1A and 1B.

Hydraulic assembly 100 is more compact than other types of hydraulic fitting, and can be beneficially deployed in restricted spaces and/or in situations where there are a large number of hydraulic connections to be made. Hydraulic assembly 100 is more serviceable than other types of hydraulic fitting. For example, gasket 118 can easily be removed and replaced. Furthermore, hydraulic assembly 100 may be able to accommodate a hydraulic hose with a smaller diameter than conventional hydraulic fittings can accommodate.

Figure 7:
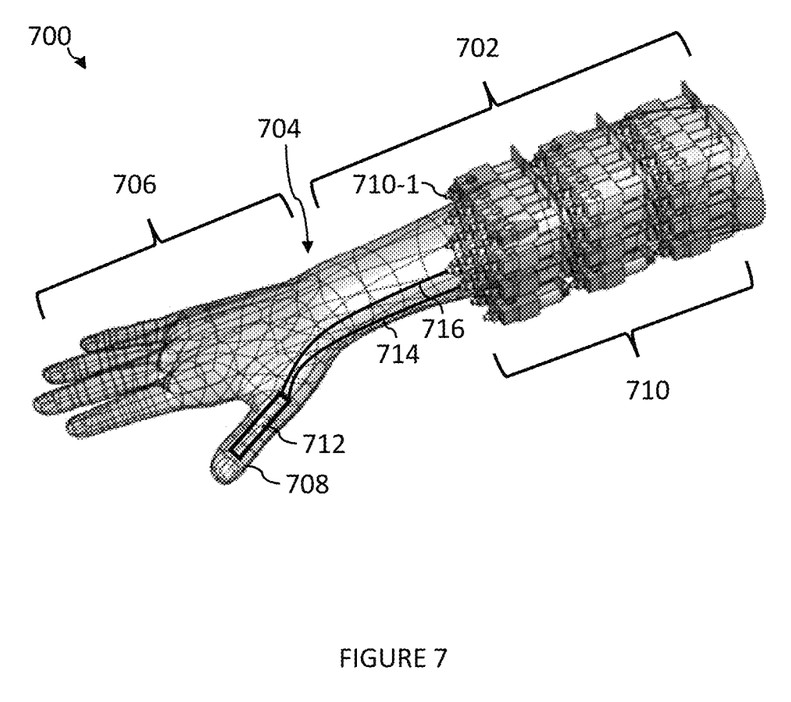
FIG. 7 is a schematic drawing of an example implementation of a portion of a hydraulic system in a forearm, wrist, and hand of a robot (e.g., the robot of FIG. 6), in accordance with the present systems, devices, and methods.

FIG. 7 is a schematic drawing of an example implementation of a portion 700 of a hydraulic system in a forearm 702, wrist 704, and hand 706 of a robot (e.g., robot 600 of FIG. 6), in accordance with the present systems, devices, and methods. Hand 706 includes a digit 708.

Forearm 702 includes a set of valves 710 which is integrated with forearm 702. Valves 710 include valve 710-1. (Only one valve is separately labeled for clarity of illustration.) Valves 710 may include pressure valves and exhaust valves. Valves 710 may include electrohydraulic servo valves, and may be operated by a controller (not shown in FIG. 7).

Digit 708 includes an actuation piston 712 integrated with digit 708. Actuation piston 712 is hydraulically coupled to valves 710 via a pressure hose 714 and an exhaust hose 716.

Pressure hose 714 and exhaust hose 716 pass through wrist 704. Wrist 704 can be a restricted space (as described above), and, while the diameters of hoses 714 and 716 may generally need to be large enough to fulfill the pressure/force requirements of portion 700 of the hydraulic system, it can be advantageous for a respective diameter of each of hoses 714 and 716 to be small enough, and flexible enough, in the region of wrist 704, to navigate wrist 704.

Hydraulic assembly 100 of FIGS. 1A and 1B can be used in portion 700 of the hydraulic control system of FIG. 7 to provide hydraulic coupling of hydraulic hoses (e.g., hoses 714 and 716) to hydraulic components (e.g., valves 710 and actuation piston 712). For example, a hydraulic component may include a body having an upper port and a lower port (e.g., body 104, and upper and lower ports 106 and 110 of FIG. 1B) for receiving a hydraulic hose. The hydraulic hose may be inserted into the upper port and secured to the body as described with reference to FIGS. 1A and 1B.

As shown in FIG. 7, forearm 702, wrist 704, and hand 706 can be restricted spaces, and there can a large number of hydraulic connections to be made (e.g., to valves 710). In one implementation, there are two double-acting DOFs, and consequently twenty (20) hoses running to hand 706 to control eighteen (18) DOFs of each hand. In some implementations, there are twenty (20) one-eighth inch (⅛ in.) hoses to accommodate in forearm 702, wrist 704, and hand 706.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A hydraulic assembly comprising:
   a hydraulic hose having an end section that terminates at an open end, the end section formed from a volume of material, the end section comprising:
      a first length of hose having a first outer diameter;
      a flange adjoining the first length of hose, the flange formed in the volume of material, the flange having a second outer diameter; and
      a second length of hose adjoining the flange and terminating at the open end, the second length of hose having a third outer diameter;
   an annular gasket threaded onto the second length of hose adjacent to the flange, and between the flange and the open end of the hydraulic hose, wherein the second outer diameter is greater than the first outer diameter and the third outer diameter; and
   a body having a first port and a second port, and an axial bore extending therebetween, a length of the hydraulic hose inserted into the axial bore through the first port, the length of the hydraulic hose being less than a distance along the axial bore between the first port and the second port.

2. The hydraulic assembly of claim 1, wherein the volume of material comprises a thermoplastic material.

3. The hydraulic assembly of claim 2, wherein the thermoplastic material is nylon.

4. The hydraulic assembly of claim 1, wherein the second outer diameter is at least 10% greater than the first outer diameter and the third outer diameter.

5. The hydraulic assembly of claim 1, wherein the annular gasket is an 0-ring.

6. The hydraulic assembly of claim 1, wherein at least a portion of the end section comprises a molded section of hose that includes the flange.

7. The hydraulic assembly of claim 1, wherein the first length of hose, the flange, and the second length of hose have at least approximately a same inner diameter.

8. The hydraulic assembly of claim 1, wherein the annular gasket forms an interference-fit with an inner surface of the axial bore.

9. The hydraulic assembly of claim 1, wherein the body of the assembly includes an interface towards which, during the inserting of the hydraulic hose into the axial bore through the first port, the flange is urged to form a hydraulic seal between an outer surface of the hydraulic hose and the body.

10. The hydraulic assembly of claim 1, wherein a first diameter of the axial bore at the first port is larger than a second diameter of the axial bore at the second port.

11. The hydraulic assembly of claim 1, further comprising a cover plate securing the hydraulic hose to the body.

12. The hydraulic assembly of claim 1, wherein the body is a body of a hydraulic manifold.

13. A hydraulic assembly, comprising:
   a hydraulic hose having an end section that terminates at an open end, the end section formed from a volume of material the end section comprising:
      a first length of hose having a first outer diameter;
      a flange adjoining the first length of hose, the flange formed in the volume of material, the flange having a second outer diameter; and
   a second length of hose adjoining the flange and terminating at the open end, the second length of hose having a third outer diameter; and
   an annular gasket threaded onto the second length of hose adjacent to the flange, and between the flange and the open end of the hydraulic hose, wherein the second outer diameter is greater than the first outer diameter and the third outer diameter;
   wherein the first outer diameter is 0.055" or less.

14. The hydraulic assembly of claim 13, wherein the second outer diameter is 0.0625" or more.

* * * * *